April 29, 1952 W. W. MAHER 2,594,327
LEAKY CAN REJECT MECHANISM FOR CAN TESTING MACHINES
Filed Dec. 22, 1947 6 Sheets-Sheet 1

INVENTOR
William W. Maher
BY Ivan O. Thornburgh
Charles H. Gene
ATTORNEYS

April 29, 1952      W. W. MAHER      2,594,327
LEAKY CAN REJECT MECHANISM FOR CAN TESTING MACHINES
Filed Dec. 22, 1947      6 Sheets-Sheet 2
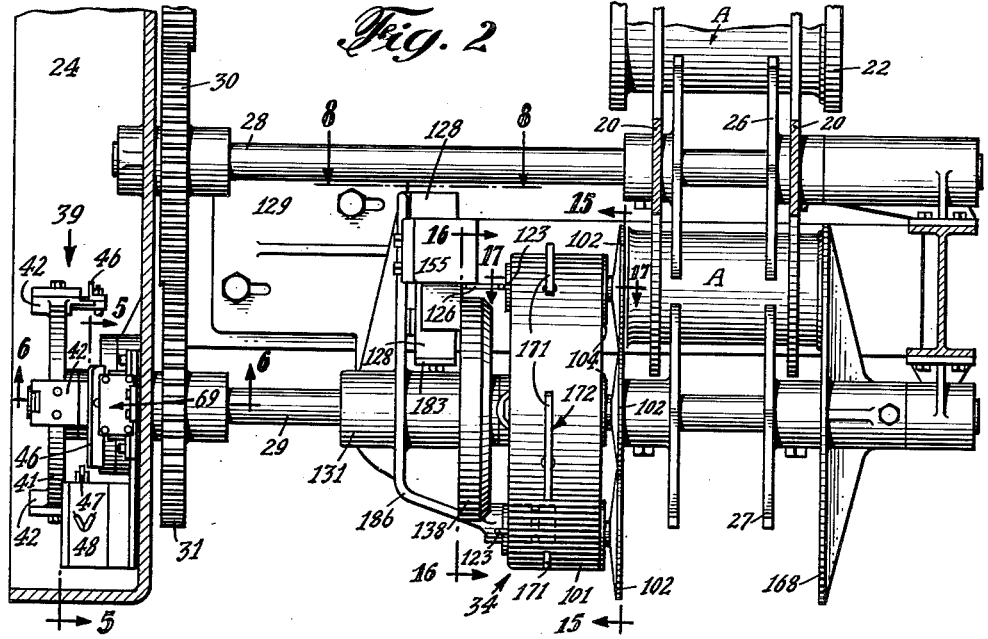
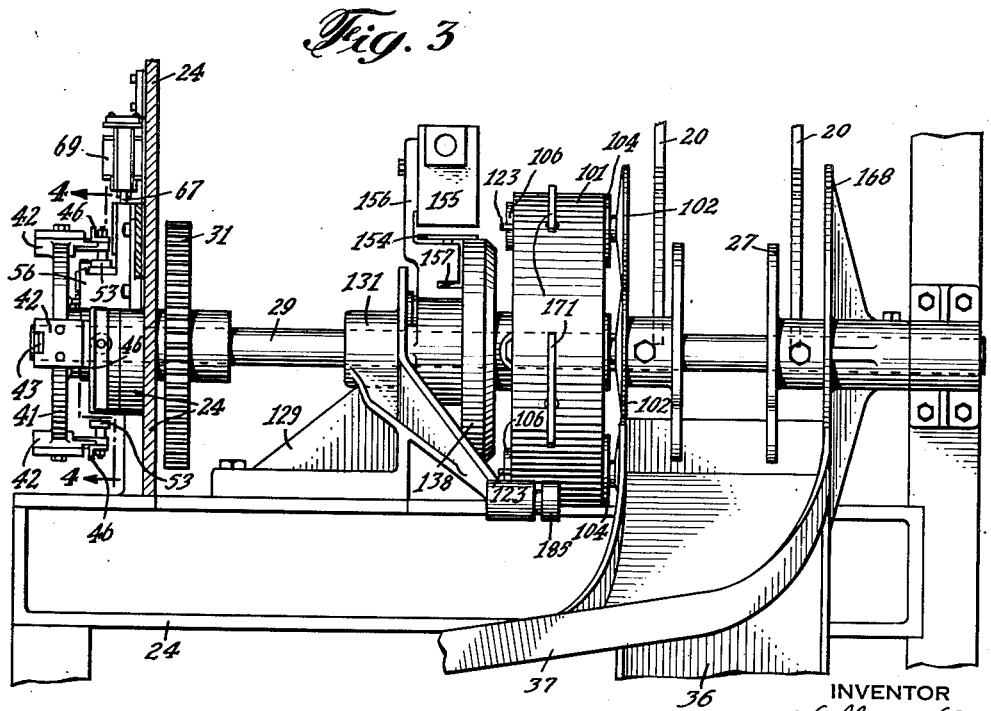
INVENTOR
William W. Maher
BY
ATTORNEYS

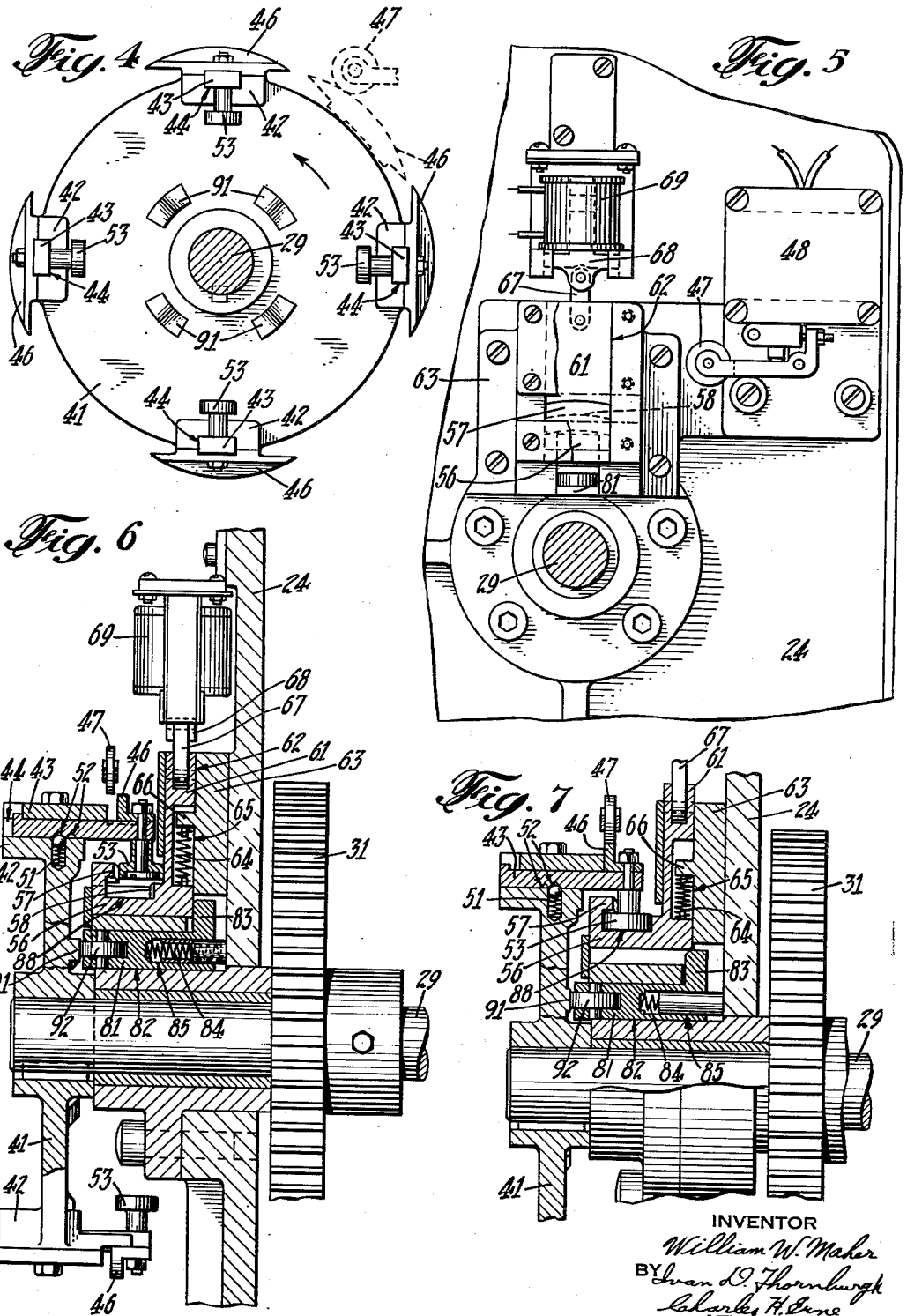

April 29, 1952     W. W. MAHER     2,594,327
LEAKY CAN REJECT MECHANISM FOR CAN TESTING MACHINES
Filed Dec. 22, 1947     6 Sheets-Sheet 4
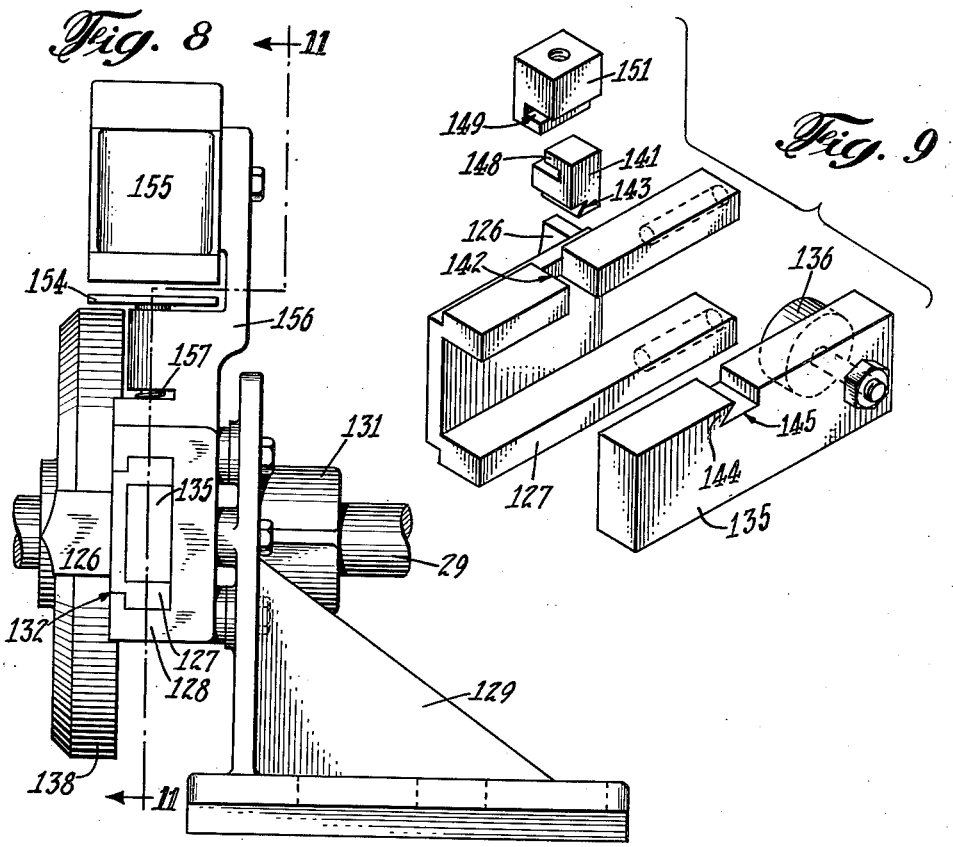
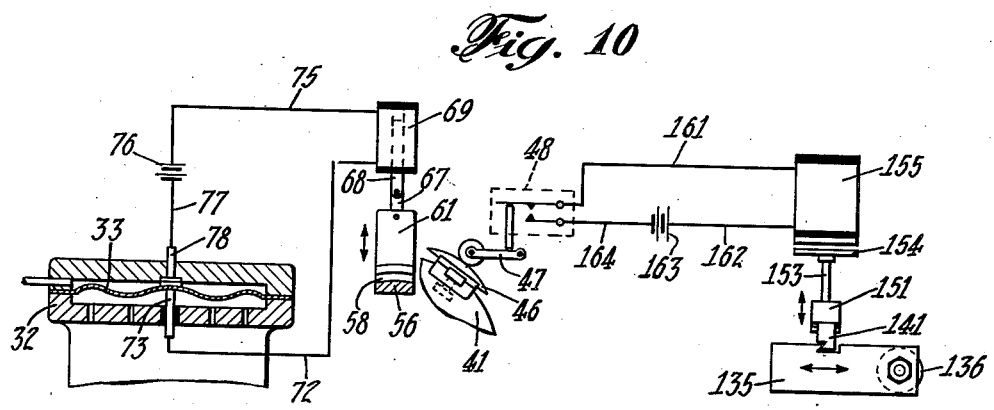
INVENTOR
William W. Maher
BY
ATTORNEYS

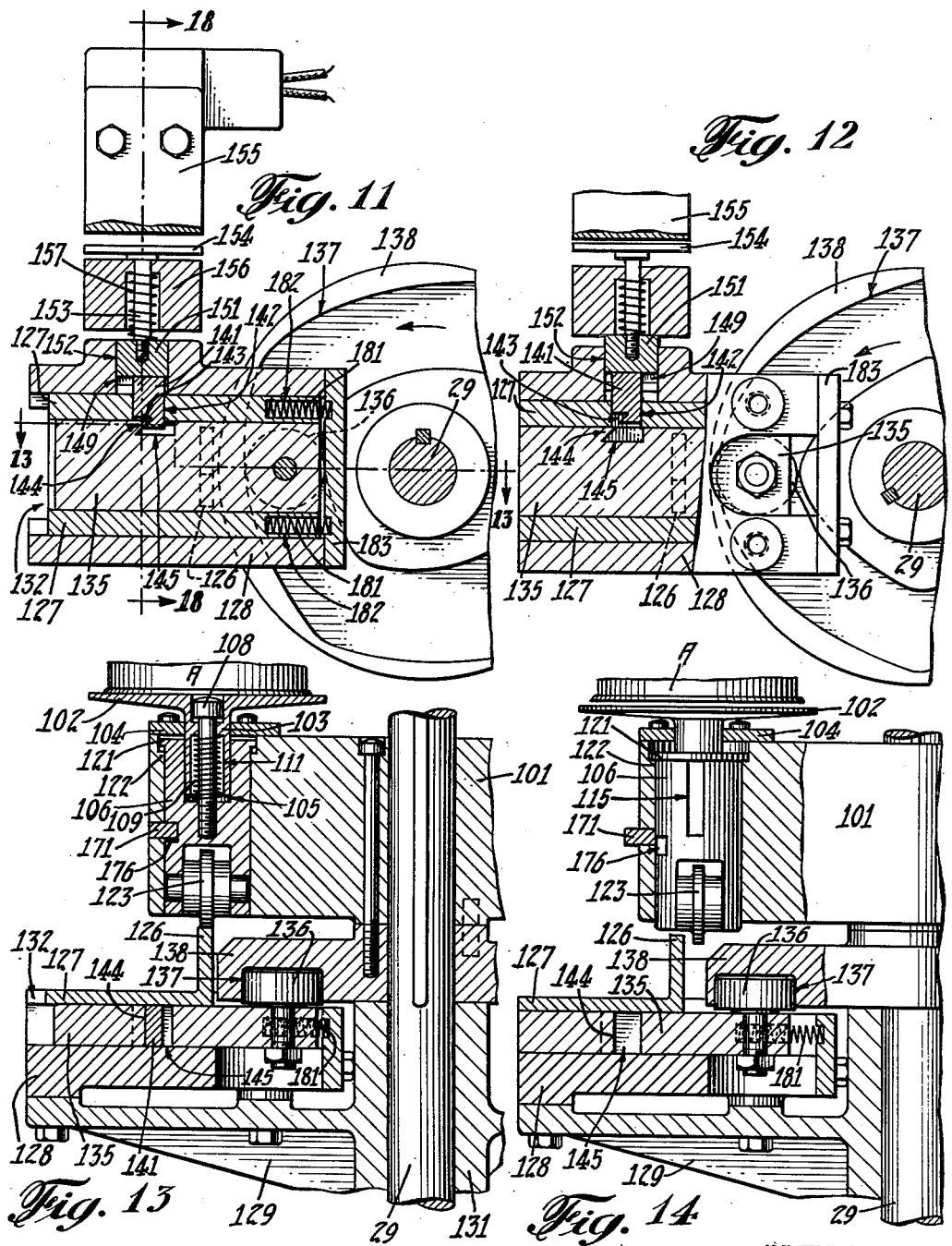

April 29, 1952 W. W. MAHER 2,594,327
LEAKY CAN REJECT MECHANISM FOR CAN TESTING MACHINES
Filed Dec. 22, 1947 6 Sheets-Sheet 6
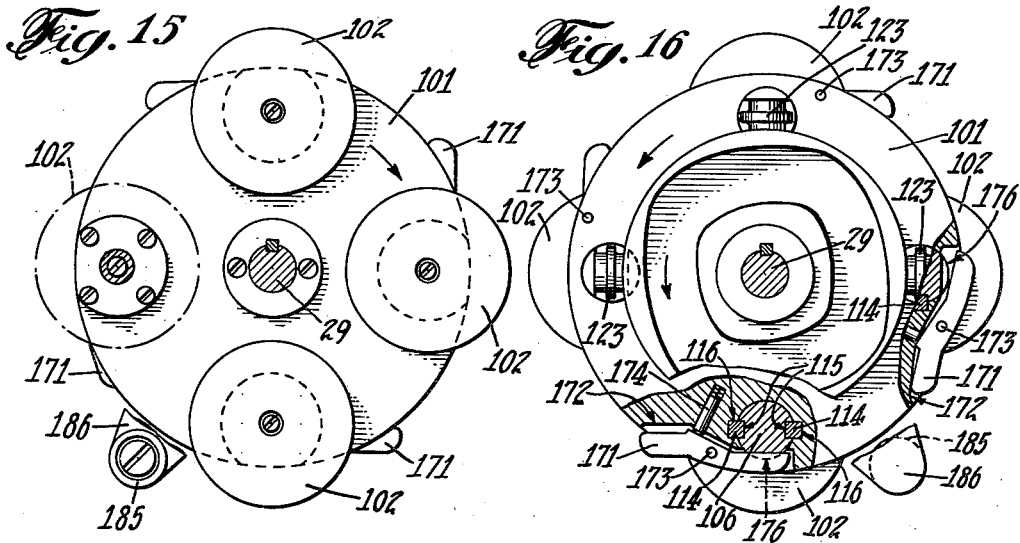
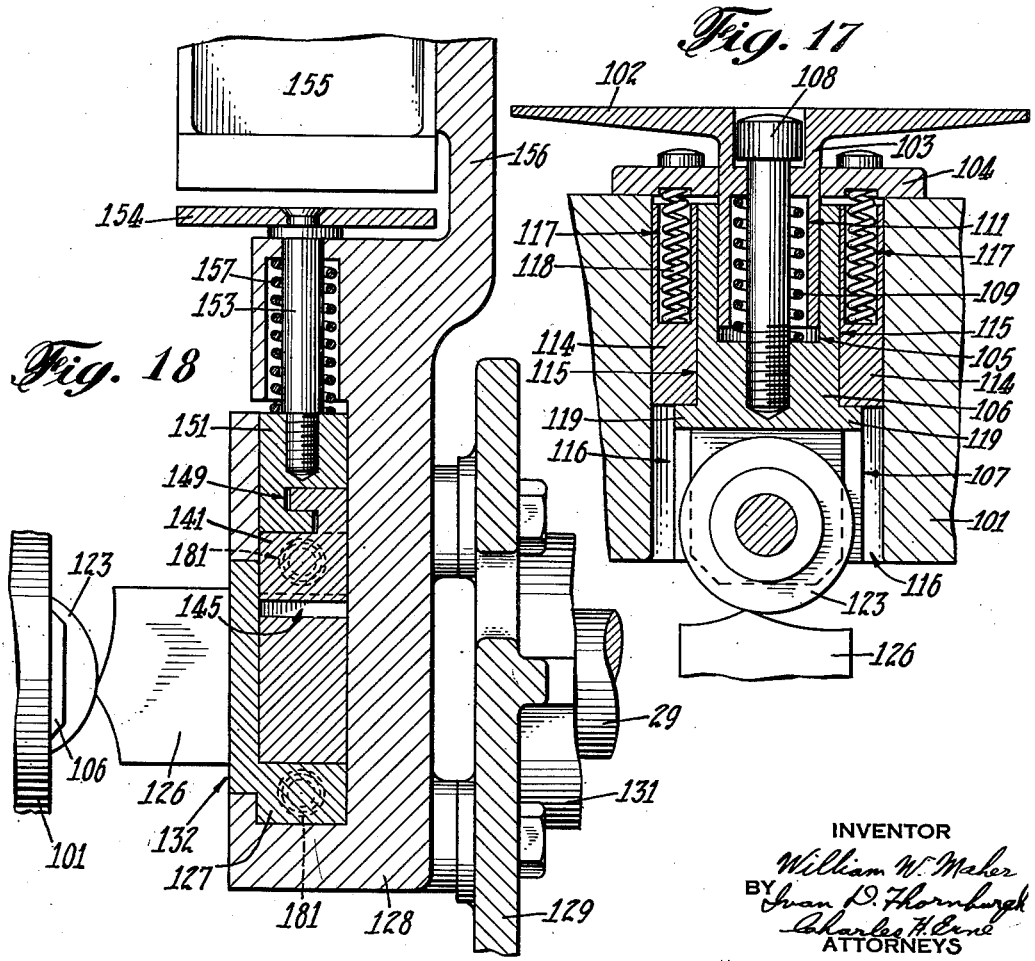
INVENTOR
William W. Maher
BY
ATTORNEYS Patented Apr. 29, 1952

2,594,327

UNITED STATES PATENT OFFICE 2,594,327

LEAKY CAN REJECT MECHANISM FOR CAN TESTING MACHINES

William W. Maher, San Francisco, Calif., assignor to American Can Company, New York, N. Y., a corporation of New Jersey Application December 22, 1947, Serial No. 793,084

11 Claims. (Cl. 73—43)

The present invention relates to container or can testing machines in which cans are subjected to air under pressure to detect those which leak and has particular reference to a high speed reject mechanism having a rotary delayed timing action for separating leaky cans from non-leaky cans and for discharging them from the machine.

An object of the invention is the provision in a can testing machine of reject devices wherein cans that leak are separated from the good, non-leaking cans in a manner which is effective in and readily adapted to high speed operating machines.

Another object is the provision of such reject devices wherein a rotary delayed timing action may be had so that the operation of the reject devices will be smooth and steady with the result that greater efficiency and saving in repairs and replacement of parts is provided.

Numerous other objects and advantages of the invention will be apparent as it is better understood from the following description, which, taken in connection with the accompanying drawings, discloses a preferred embodiment thereof.

Referring to the drawings:

Fig. 2 is an enlarged top plan view of the portion of the machine shown at the right in Fig. 1, with parts broken away;

Fig. 3 is an end elevation of the portion of the machine shown in Fig. 2, with parts broken away;

Figure 1:
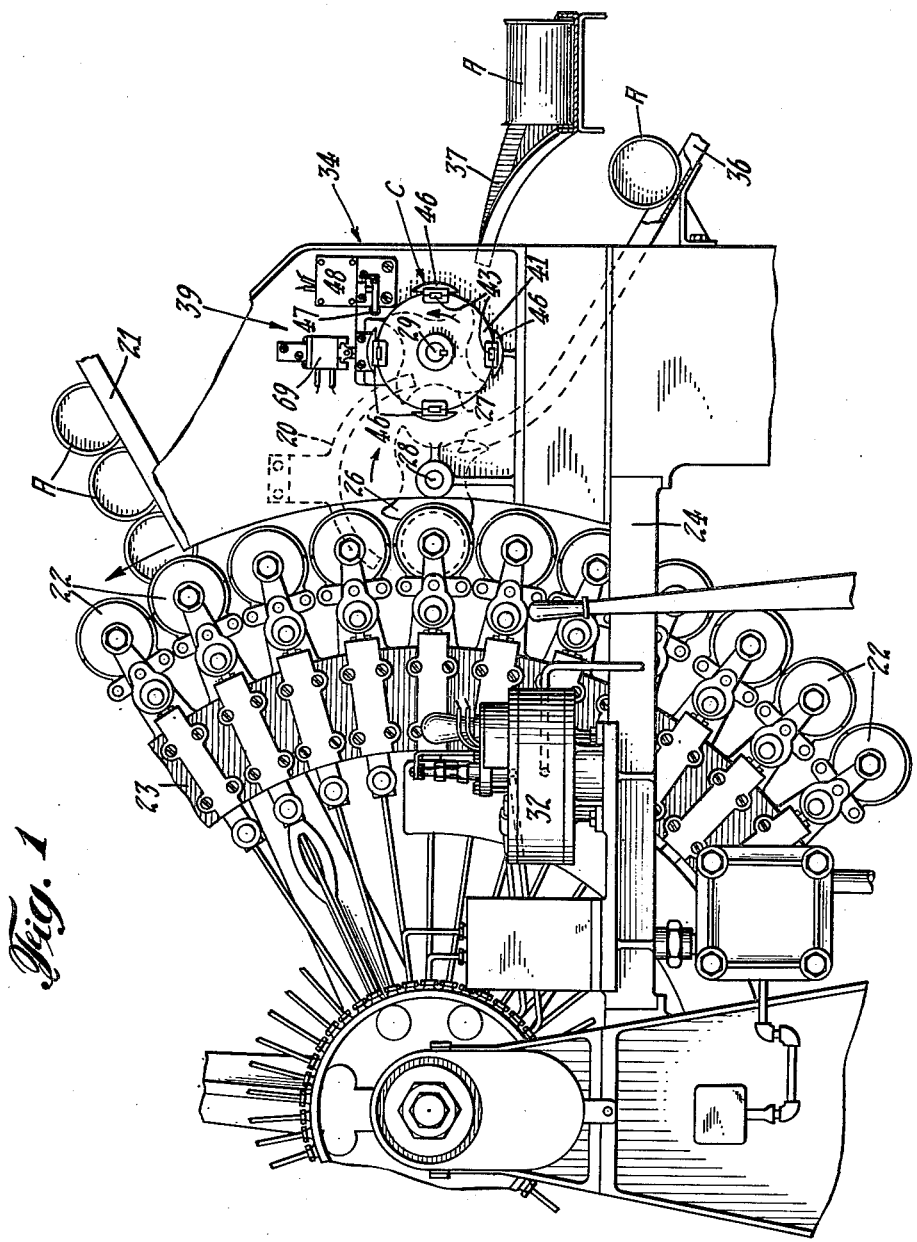
Figure 1 is a side elevation of the can discharge portion of a can testing machine embodying the instant invention, with parts broken away.

Figs. 4 and 5 are enlarged sectional views taken substantially along the lines 4—4, 5—5, in Figs. 3 and 2 respectively, with parts broken away;

Fig. 6 is an enlarged sectional view taken substantially along the line 6—6 in Fig. 2, with parts broken away;

Fig. 7 is a view similar to Fig. 6 with certain of the moving parts in a different position;

Fig. 8 is an enlarged elevational detail as viewed substantially along a plane indicated by the line 8—8 in Fig. 2, with parts broken away;

Fig. 9 is an enlarged exploded perspective view of certain of the parts shown in Fig. 8;

Fig. 10 is a schematic view of the control parts of the time delay and reject devices, the view including a wiring diagram of the electric apparatus used in these devices;

Fig. 11 is a sectional view taken substantially along the broken line 11—11 in Fig. 8, with parts broken away;

Fig. 12 is a view similar to Fig. 11 and showing certain of the moving parts in a different position;

Figs. 13 and 14 are sectional views taken substantially along the line 13—13 in Fig. 11 and showing different positions of certain of the moving parts, with parts broken away;

Figs. 15, 16 and 17 are enlarged sectional views taken substantially along the respective lines 15—15, 16—16, 17—17 in Fig. 2, with parts broken away, and with Fig. 17 turned through an angle of ninety degrees; and Fig. 18 is an enlarged sectional view taken substantially along the line 18—18 in Fig. 11, with parts broken away.

As a preferred embodiment of the invention the drawings illustrate principal parts of a can testing machine of the type disclosed in United States Patent 2,019,517 issued November 5, 1935 to M. E. Widell on Can Tester. In such a machine, a continuous procession of cans A rolling on their sides, enter the machine to be tested, by way of an inclined chute 21 (Fig. 1). The cans are individually picked up from the chute 21 by a testing head 22 in which a can is clamped for testing. There are a plurality of these testing heads 22 mounted on the outer peripheries of a pair of spaced and parallel wheels 23 which are mounted in a frame 24 constituting the main frame of the machine. The wheels are rotated continuously in any suitable manner.

The tester wheels 23 carry a can A, clamped in a testing head 22, through a circular path of travel during which the can is tested. After testing, the can is engaged by an extractor turret 26 (Figs. 1 and 2) having four equally spaced pockets which remove the tested can from its testing head and carry it through a reversed circular path of travel into the grip of a discharge turret 27 having four equally spaced pockets for receiving and discharging the cans. A pair of spaced curved guide rails 29 disposed adjacent the periphery of the extractor turret 26 maintain the cans in the turrets during their travel with this turret.

The extractor turret 26 and its cooperating discharge turret 27 are located just below the can entrance chute 21 and are mounted on respective driving shafts 28, 29 journaled in the machine frame 24. The shafts are rotated continuously in unison, through a pair of meshing gears 30, 31 mounted on the shafts, and in time with the tester wheels 23, in any suitable manner.

Testing of a can for leaks as it travels with its testing head 22 is effected by introducing air under pressure into the can and sealing off the can by clamping its open end against a clamping head, as explained in the above mentioned Widell patent. A leaky can is detected by a detector valve 32 containing a diaphragm 33 (see Fig. 10) which moves upon disturbance from a predetermined balanced condition by reason of leakage of air from the can. This detector valve 32 controls the operation of a discharge or reject device 34 (Figs. 1 and 2) which is disposed adjacent the discharge turret 27 and which acts to release a can into a good can outlet or chute 36 (Fig. 1) or to hold it for release into a leaky or bad can outlet 37, in accordance with the condition of the can as detected by the detector valve.

Since a leaky can A is detected while it is still in its testing head 22, a rotary high speed time delay device 39 (Fig. 1) is incorporated in the reject mechanism and operates in time with the leaky can as it is advanced by the extractor turret 26 to insure rejection of the proper can by the discharge device. This time delay device 39 includes a rotatable timing disc 41 (Figs. 4 and 6) which is mounted on the outer end of the discharge turret shaft 29 and which rotates with the shaft.

The timing disc 41, adjacent its outer periphery, is formed with four equally spaced housings 42, one for each pocket of the discharge turret 27. Each housing 42 carries a slide bar 43 which is disposed transversely of the disc and which operates in a slideway 44 formed in the housing. The inner end of each slide bar 43 extends beyond its housing and carries a curved shoe 46.

In the normal position of the side bars 43 as shown in Fig. 6 the disc 41 as it rotates, carries each shoe 46 past a movable element 47 of a normally closed electric switch 48 (Fig. 5) associated with the reject mechanism. The switch is bolted to the machine frame 24. For a leaky can the slide bar 43 is pushed outwardly as shown in Fig. 7 to position its shoe 46 into alignment with the movable switch element 47 for actuating the switch. A spring and ball detent 51 carried in the disc adjacent each slide bar is engageable in notches 52 formed in the bar for holding the bar in a shifted position. A cam roller 53 secured to the inner end of each slide bar is provided for shifting the bars.

Shifting of a slide bar 43 is effected by a two level cam element 56 (Figs. 5 and 6) having a short high level, tapered, outer cam 57 and a short low level, tapered, inner cam 58. The high level cam 57 is normally disposed adjacent the circular path of travel of the cam rollers 53 as they travel around with the timing disc 41 and thus the rollers successively engage against this cam as they pass by for maintaining or for resetting the slide bars 43 in their normal position.

For a leaky can, the cam element 56 is elevated to locate the low level cam 58 into the path of travel of the rotating rollers 53. For this purpose the cam element 56 is formed on the bottom of a vertical slide 61 located in a slideway 62 formed in a bracket 63 bolted to the machine frame 24. The slide is operated under pressure of a compression spring 64 located in a recess 65 formed in the slide and interposed between the slide and a lug 66 formed on the bracket and extending into the recess as shown in Figs. 6 and 7. The upper end of the slide is connected by a link 67 to a movable core element 68 of a normally de-energized electric solenoid 69 bolted to the machine frame 24.

Referring now to the wiring diagram in Fig. 10 it will be seen that one side of the solenoid 69 is connected by a wire 72 to a switch contact 73 secured in and movable with the leaky can detector diaphragm 33. The opposite side of the solenoid is connected by a wire 75 to a suitable source 76 of electric current. This source of current is also connected by a wire 77 to a fixed switch contact 78 carried in the detector valve 32 in alignment with the movable contact 73.

Hence when a leaky can is detected by the detector valve 32, through disturbance from a predetermined balanced condition by reason of leakage of air from the can, the diaphragm 33 flexes up and brings its contact 73 into engagement with the fixed contact 78 and thereby establishes the circuit connecting with the solenoid 69. This energizes the solenoid and lifts its movable core 68 and the cam element 56 connected therewith as shown in Fig. 7. It is this lifting of the cam element 56 that raises the low level cam 58 into position in alignment with the path of travel of the timing disc cam rollers 53. This energizing of the solenoid is of only a momentary duration and is effected while a space between two cam rollers 53 is opposite the cam element 56 so as to avoid interference with the rollers and so as to set the cam for the approaching roller.

After the elevation or setting of the cam element 56, it is held in position against return to its normal position so that the solenoid may be immediately deenergized for action if necessary on the next can in the testing wheels. This holding action is effected by a locking slide 81 (Figs. 5, 6 and 7) which is disposed under the cam element 56 and which is located in a horizontal slideway 82 formed in the bracket 63.

The locking slide 81 is formed with a locking lug 83. This lug is pushed under the cam element 56 when the latter is in an elevated position as shown in Fig. 7 and thereby holds the cam element elevated. The lug is pushed into locking position by a compression spring 84 which is located in a recess 85 in the locking slide 81 and is interposed between the bottom of the recess and the machine frame 24.

The detection of a leaky can is effected just prior to its entry into a pocket of the extractor turret 26 as shown in Fig. 1. The switch actuating shoe 46 for this leaky can, at this time is disposed as marked by the letter C in Fig. 1. Hence as this actuating shoe approaches the cam element 56 in the direction of the arrow shown in Fig. 1, the cam element is lifted as explained above so that the cam roller 53 for the shoe C will engage the low level cam 58 as shown in Fig. 7. A clearance recess 88 (Figs. 6 and 7) disposed in the cam element 56 adjacent the low level cam 58 permits of this action.

As the cam roller 53 for the shoe C passes the elevated cam element 56 with the continued rotation of the timing disc 41, the roller rides along the lower level cam 58 and is thus pushed outwardly. This pushes the slide bar 43 for the shoe C outwardly and thus positions the shoe C for engagement with the switch element 47. Contact with this switch element, however, is not made until the timing disc 41 has made nearly one complete revolution as will be seen by reference to Fig. 1. This delays the time of operation of the reject device until the leaky can has completed its travel with the extractor turret 26 and enters the discharge turret 27.

As soon as the cam roller 53 for the shoe C has passed the cam element 56 and is clear of the low level cam 58, the cam 58 is immediately returned to its original low level position as shown in Fig. 6 for a repeat operation if necessary for the next following can in the tester wheels, if this can is also detected as a leaky can. This return of the cam element 56 is brought about by a short cam projection 91 (Figs. 4, 6 and 7) formed on the inner face of the timing disc 41.

There are four of these return cam projections 91, one for each actuating shoe 46 and they are located substantially midway between adjacent shoes as shown in Fig. 4. These cam projections engage against a cam roller 92 carried in the adjacent end of the locking slide 81 and press this slide inwardly as a projection passes by. Inward movement of the slide forces the locking lug 83 from under the cam element 56 into its normal position as shown in Fig. 6 and this permits the cam element spring 64 to return the cam element to its normal position. The locking lug engages behind the lowered cam element and thus holds the locking slide 81 in its normal position as shown in Fig. 6.

When the shoe C, traveling with the rotating timing disc 41 completes its timing cycle and engages the switch element 47 and thereby opens the switch 48, the reject device operates to lock or clamp the leaky can in the discharge turret 27 and carry it past the good can chute 36 for delivery into the leaky can chute 37 as mentioned above. This locking of the leaky can in the discharge turret is effected by a reject drum 101 (Figs. 2, 3, 15 and 16) which is mounted on the continuously rotating shaft 29 adjacent and rotating with the discharge turret 27.

The reject drum 101 carries a plurality of clamping or locking plates 102 (see also Fig. 17) which project out from the inner face of the drum and extend toward the discharge turret 27. There are four of these clamping plates 102, one for each pocket of the discharge turret and they are in endwise alignment with a can carried in a pocket. Each clamping plate 102 is formed on a stem 103 (Fig. 17) which extends through an opening in a retaining plate 104 secured to the face of the drum.

Inwardly of the retaining plate 104, the stem 103 fits within a bore 105 of a slide 106 which operates in a transverse bore 107 in the drum. The clamping plate 102 is secured to the slide by a long bolt 108 which extends through the stem 103 and is threadedly engaged in the slide. A compression spring 109 disposed in a recess 111 in the stem provides a yieldable connection between the clamping plate and the slide. This spring surrounds the bolt 109 and is interposed between the slide and the bottom of the recess 111 in the stem.

Each plate slide 106 is keyed in place in the drum 101 and is maintained under spring pressure for retaining the clamping plates 102 in a contracted position adjacent the inner face of the drum. For this purpose two square keys 114 (see Figs. 16 and 17) are provided for each slide and they operate in keyways 115, 116 formed respectively in the slide and in the drum. Each key is formed with a longitudinal recess 117 which contains a compression spring 118 the outer end of which presses against the retaining plate 104. These springs press the inner ends of the keys against shoulders 119 formed in the slide and thus keep the slide and the clamping plate in its normal retracted position.

A collar 121 (see Figs. 13 and 14) on the inner end of the slide 106 engages against a shoulder 122 in the drum and thus limits the outward travel of the slide. The outer end of each slide 106 extends beyond the outer face of the drum 101 and carries a cam roller 123 for pushing the slide and the clamping plate 102 into leaky can clamping position as will be more fully explained hereinafter.

Shifting of a slide 106 and its attached clamping plate 102, through engagement of its roller 123, is brought about by a movable clamp shoe 126 (Figs. 8, 13, 14 and 18) which is normally disposed adjacent but clear of the circular path of travel of the rollers 123 as they are carried around by the reject drum 101. There is only one shoe 126 and it projects laterally from a normally stationary channel shaped retainer 127 (see Fig. 9) slideably carried in a housing 128 bolted to a bracket 129 secured to the machine frame 24. The bracket is formed with a bearing 131 for the discharge turret shaft 29. The clamp shoe 126 extends through an opening 132 in the outer face of the housing 128.

The retainer 127 supports and guides a continuously reciprocating slide member 135 (see Fig. 9) which is slideably disposed within the retainer as shown in Figs. 8, 11 and 13. Reciprocation of the slide member 135 is effected by a cam roller 136 which is carried on one end of the slide and which operates in a cam groove 137 of a continuously rotating face cam 138 mounted on the discharge turret shaft 29 and bolted to the reject drum 101. Thus the slide member reciprocates freely within the retainer 127 while the retainer remains stationary under normal conditions as when good cans are passing through the discharge device.

When a leaky can is detected as hereinbefore mentioned, the retainer 127 is shifted with the slide member 135 for one stroke of the slide member and is then released. This is brought about by a latch dog 141 (Fig. 9) which is disposed in a slot 142 in the side of the retainer 127 as shown in Fig. 12. The lower end of the dog is formed with a driving notch 143 which is disposed just above and clear of the path of travel of a hook 144 formed adjacent a recess 145 in the reciprocating slide member 135.

The upper end of the latch dog 141 is formed with an L-shaped key 148 which is engaged in and is slideable along a slot 149 in a square block 151 (Figs. 11 and 12) disposed in a vertical recess 152 formed in the top of the retainer housing 128. The square block 151 is secured to the lower end of a stem 153 of a magnet plate 154 associated with a normally energized electromagnet 155 bolted to a bracket 156 formed as a part of the retainer housing 128.

The stem is carried in the bracket and is surrounded by a compression spring 157 disposed in a recess formed in the bracket and interposed between the bottom of the recess and the square block. The normally energized magnet holds the block 151 and the latch dog 141 in a normal elevated position as shown in Fig. 12 while the spring forces the dog into operating position when the magnet is de-energized. The electromagnet 155 is connected by a wire 161 to one side of the time delay switch 48 (see Fig. 10). It is also connected by a wire 162 to a suitable source 163 of electric current. The source of current is also connected by a wire 164 to the other side of the switch 48.

Hence when the electric switch 48 is opened by the time delay shoe C hereinbefore mentioned, which is at the time a leaky can is received in the discharge turret 27, the electromagnet 155 is momentarily de-energized and this releases the magnet plate 154 and thus permits the spring 157 to force the latch dog 141 down into the recess 145 in the continuously reciprocating slide member 135. Thus upon the next forward stroke of the slide member (toward the right as viewed in Figs. 11 and 12) the hook 144 of the slide engages in the notch 143 in the dog 141 and thus carries the dog and the channel shaped retainer 127 through a forward stroke with it. This shifting of the retainer 127 moves its clamp shoe 126 from the position shown in Fig. 14 to that shown in Fig. 13 where the shoe is in alignment with the roller 123 of the clamping plate 102 which is opposite the leaky can in the discharge turret 27.

This action takes place while the leaky can is held by both the extractor turret 26 and the discharge turret 27 as viewed in Fig. 1. The roller 123 immediately engages the shifted clamp shoe 126 and is forced inwardly by the shoe. This forces the clamping plate 102 inwardly against the leaky can in the discharge turret 27 and clamps the can against a rotating backing-up disc 168 (Figs. 2 and 3) mounted on the shaft 29 adjacent the turret.

The clamping plate 102 is held in this leaky can clamping position by a spring pressed finger 171 (Figs. 2, 13 and 16) which is disposed in a slot 172 formed in the reject drum 101. There is one of these fingers for each clamping plate 102. Each finger intermediate its ends is mounted on a pivot pin 173 secured in the drum. The outer end of the finger extends beyond the drum and is backed up by a spring barrel 174 carried in the drum. The inner end of the finger extends across and normally engages against the outer surface of the clamping plate slide 106.

When the slide is forced inwardly to push the clamping plate 102 into engagement with a leaky can, the inner end of the finger is forced by the spring barrel 174, into a transverse groove 176 (see Figs. 14 and 16) formed in the slide, as best shown in Figs. 13 and 16 and this retains 'the clamping plate 102 in clamping position against the leaky can after the roller 123 passes beyond the clamp shoe 126. The spring 109 in the clamping plate stem 103 holds the clamping plate against the can with a yieldable pressure to compensate for variations in can length and overthrow in the travel of the slide 106.

As soon as the clamping plate slide 106 has been locked in can clamping position the clamp shoe 126 is shifted back into its normal position by the return of the slide member 135. During this return stroke of the slide member, the retainer 127 is forced back into its normal position by a pair of compression springs 181 (Fig. 11) which are disposed in recesses 182 formed in the inner end of the retainer and backed up by a plate 183 secured to the bracket 128. The dog 141 slides with the retainer, in its groove 149 in the square block 151. When the slide member 135 returns the retainer 127 to its normal position the hook 144 becomes disengaged from the notch 143 in the dog 141 and the re-energized magnet 155 thereupon draws the dog up out of the recess 145 in the slide member. This releases the retainer from the slide member and permits the retainer to remain stationary, while the slide member continues its reciprocation, in readiness for the next leaky can.

The leaky can clamped in the discharge turret 27, is carried past the good can chute 36 and is thus prevented from entering this chute. With continued travel it approaches the leaky can chute 37 and when directly opposite this chute, the outer end of the finger 171 engages against a stationary trip roller 185 (Figs. 3, 15 and 16) carried on an arm 186 projecting out from the bracket 129. The roller depresses the outer end of the finger against the resistance of the spring barrel 174 and this withdraws the inner end of the finger from the groove 176 in the clamping plate slide 106. This releases the slide 106 and permits its springs 118 to force the slide and the clamping plate 102 outwardly. Release of the clamping plate, releases the leaky can and it falls into the leaky can chute 37 for delivery to any suitable place of deposit. This completes the cycle of operation of the reject mechanism for a leaky can.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. In a machine for testing containers for leaks, the combination of a rotatable discharge turret having a pocket for receiving a tested container, a good container chute and a leaky container chute disposed adjacent said turret, a reject drum disposed adjacent said turret and rotatable in time therewith, a backing up member disposed opposite said drum, clamping means carried in said drum and operable against a leaky container in said turret, shifting means having an operative position for shifting said clamping plate against a leaky container in said turret pocket to clamp the container against said backing up member while the container is moving past said good container chute for delivery into said leaky container chute, and a rotary timing device for moving said shifting means into clamping plate operating position when a leaky can is received in said turret pocket.

2. In a machine for testing containers for leaks, the combination of a rotatable discharge turret having a pocket for receiving a container, a good container chute and a leaky container chute disposed adjacent said turret, a reject drum disposed adjacent said turret and rotatable in time therewith, a backing up member disposed opposite said drum, clamping means carried in said drum and operable against a leaky container in said turret, shifting means for shifting said clamping means in said drum for clamping leaky containers endwise between said clamping means and said backing up member for carrying said leaky container past said good container chute for delivery into said leaky container chute for separating the leaky containers from the good containers, a rotary timing disc operable in time with the rotation of said reject drum, a movable member on said timing disc for operating said shifting means, and a movable element movable into the path of travel of said movable member for engagement therewith when a leaky can is detected for shifting said movable member into a predetermined position for operating said shifting means at the proper time.

3. In a machine for testing containers for leaks, the combination of a rotatable discharge turret having a pocket for receiving a container, a good container chute and a leaky container chute disposed adjacent said turret, a reject drum disposed adjacent said turret and rotatable in time therewith, a backing up member disposed opposite said drum, a clamping plate carried in said drum and operable against a leaky container in said turret, shifting means for shifting said clamping plate in said drum for clamping leaky containers endwise between said clamping means and said backing up member for carrying said leaky container past said good container chute for delivery into said leaky container chute for separating the leaky containers from the good containers, a rotary timing disc operable in time with the rotation of said reject drum, a slide bar carried on said timing disc and having a projecting shoe for operating said shifting means, a cam roller mounted on said slide bar for operating said bar, a movable cam element disposed adjacent the path of travel of said cam roller and in one position engageable with said roller for shifting said slide bar and its shoe into a position for operating said shifting means and in another position for resetting said slide bar and its shoe, and means connecting with said movable cam element and operable for a leaky container for shifting said cam element.

4. In a machine for testing containers for leaks, the combination of a rotatable discharge turret having a pocket for receiving a container, a good container chute and a leaky container chute disposed adjacent said turret, a reject drum disposed adjacent said turret and rotatable in time therewith, a backing up member disposed opposite said drum, a clamping plate carried in said drum and operable against a leaky container in said turret, shifting means for shifting said clamping plate in said drum for clamping leaky containers endwise between said clamping means and said backing up member for carrying said leaky container past said good container chute for delivery into said leaky container chute for separating the leaky containers from the good containers, a rotary timing disc operable in time with the rotation of said reject drum, a slide bar carried on said timing disc and having a projecting shoe for operating said shifting means, a cam roller mounted on said slide bar for operating said bar, a movable cam element disposed adjacent the path of travel of said cam roller and in one position engageable with said roller for shifting said slide bar and its shoe into a position for operating said shifting means and in another position for resetting said slide bar and its shoe, means connecting with said movable cam element and operable for a leaky container for shifting said cam element, and means adjacent said cam element for locking it in said one position and for releasing it in timed order for movement into said other position.

5. In a machine for testing containers for leaks, the combination of a rotatable discharge turret having a pocket for receiving a container, a good container chute and a leaky container chute disposed adjacent said turret, a reject drum disposed adjacent said turret and rotatable in time therewith, a backing up member disposed opposite said drum, a clamping plate carried in said drum and operable against a leaky container in said turret, shifting means for shifting said clamping plate in said drum for clamping leaky containers endwise between said clamping means and said backing up member for carrying said leaky container past said good container chute for delivery into said leaky container chute for separating the leaky containers from the good containers, a rotary timing disc operable in time with the rotation of said reject drum, a slide bar carried on said timing disc and having a projecting shoe for operating said shifting means, a cam roller mounted on said slide bar for operating said bar, a movable cam element disposed adjacent the path of travel of said cam roller and in one position engageable with said roller for shifting said slide bar and its shoe into a position for operating said shifting means and in another position for resetting said slide bar and its shoe, means connecting with said movable cam element and operable for a leaky container for shifting said cam element, a spring pressed locking slide disposed adjacent said cam element for locking it in said one position, and cam means on said timing disc and engageable with said locking slide in timed order for releasing said cam element to said other position.

6. In a machine for testing containers for leaks, the combination of a rotatable discharge turret having a pocket for receiving a container, a good container chute and a leaky container chute disposed adjacent said turret, a reject drum disposed adjacent said turret and rotatable in time therewith, a backing up member disposed opposite said drum, a clamping plate carried in said drum and operable against a leaky container in said turret, shifting means for shifting said clamping plate in said drum for clamping leaky containers endwise between said clamping means and said backing up member for carrying said leaky container past said good container chute for delivery into said leaky container chute for separating the leaky containers from the good containers, a rotary timing disc operable in time with the rotation of said reject drum, a slide bar carried on said timing disc and having a projecting shoe for operating said shifting means, a cam roller mounted on said slide bar for operating said bar, a movable cam element having a pair of oppositely disposed cams arranged at different levels disposed adjacent the path of travel of said cam roller and in one position engageable with said roller for shifting said slide bar and its shoe into a position for operating said shifting means and in another position for resetting said slide bar and its shoe, and electric means connecting with said movable cam element and operable for a leaky container for shifting said cam element.

7. In a machine for testing containers for leaks, the combination of a rotatable drive shaft, a discharge turret having a plurality of pockets mounted on said shaft for receiving containers which have been tested for leaks and for segregating good containers from leaky containers, a rotary timing disc mounted on said shaft, a switch actuating member carried on said timing disc, a good container chute and a leaky container chute disposed adjacent said turret, a reject drum mounted on said shaft at one side of said turret, a backing-up disc mounted on said shaft on the side of the turret opposite said drum, a plurality of slides carried in said drum and located one adjacent each pocket in the turret and having movement longitudinally of said shaft, a clamping plate mounted on one end of each slide, a cam roller carried on the opposite end of said slide, a housing adjacent to said shaft and disposed adjacent said reject drum, a channel retainer mounted in said housing and extending at right angles to said shaft, a constantly moving slide member mounted in said channel retainer, latch means for connecting said channel retainer with said moving slide member, and switch means connected with said latch means and operable by the switch actuating member of said timing disc to make said latch means effective to position said retainer for engagement with the cam roller on said clamping plate slide for clamping the leaky container between its clamping plate and said clamping disc for carrying said leaky container past said good container chute for delivery into said leaky container chute.

8. In a machine for testing containers for leaks, the combination of a rotatable drive shaft, a discharge turret having a plurality of pockets mounted on said shaft for receiving containers which have been tested for leaks, a good container chute and a leaky container chute disposed adjacent said turret, a reject drum mounted on said shaft on one side of said turret, a backing-up disc mounted on said shaft at the side of said turret opposite said drum, a plurality of slides carried in said drum and located one adjacent each pocket in the turret and having movement longitudinally of said shaft, a clamping plate mounted on one end of each slide, a cam roller carried on the opposite end of said slide, a housing adjacent to said shaft and disposed adjacent said reject drum, a channel retainer mounted in said housing and extending at right angles to said shaft, a constantly moving slide member mounted in said channel retainer, latch means for connecting said channel retainer with said moving slide member, a rotatable timing disc operable in time with the rotation of said reject drum, a slide bar carried on said timing disc and projectable into operative position by the presence of a leaky container, an electric time delay switch actuated by said projected slide bar, and magnetic means connecting with said latch means and operable by said time delay switch for effecting movement of said channel retainer to position it for engagement with the cam roller on said clamping plate slide for clamping the leaky container between its clamping plate and said clamping disc at the time it is moving past said good container chute for delivery of the leaky container into said leaky container chute.

9. In a machine for testing containers for leaks, the combination of a rotatable discharge turret for receiving tested containers from a testing machine and for segregating the leaky containers from the good containers, a time delay device rotatable with said discharge turret and having a switch actuating member movable on said device by a leaky can at the time the can is tested in the testing machine, a rotatable reject drum adjacent to and operating in time with said discharge turret, a clamping plate carried by said reject drum and movable against a can in said discharge turret, and electrical means including a switch which is operated by the switch actuating member of said time delay device when the leaky can reaches said discharge turret, said electrical means effecting movement of said clamping plate to clamp said leaky can in said discharge turret to segregate it from the tested good cans.

10. In a machine for testing containers for leaks, the combination of a rotatable discharge turret for receiving tested containers from a testing machine and for segregating the leaky containers from the good containers, a time delay device rotatable with said discharge turret and having a movable part actuated by a leaky can at the time the can is tested in the testing machine, a rotatable reject drum adjacent to and operating in time with said discharge turret and having clamping means for holding leaky cans in said discharge turret, a constantly moving member disposed adjacent said reject drum, and latch means located at one side of said constantly moving member and operable by the actuated part of said time delay device when the leaky can reaches said discharge turret for connecting the clamping means of said reject drum with said constantly moving member to clamp the leaky can in said discharge turret to segregate it from the tested good cans.

11. In a machine for testing containers for leaks, the combination of a rotatable discharge turret for receiving tested containers from a testing machine and for segregating the leaky containers from the good containers, a time delay device rotatable with said discharge turret and having a switch actuating member movable by a leaky can at the time the can is tested in the testing machine, a rotatable reject drum adjacent to and operating in time with said discharge turret and having clamping means for holding leaky cans in said discharge turret, a constantly moving member disposed adjacent said reject drum, latch means located at one side of said constantly moving member for connecting the clamping means of said reject drum with said constantly moving member, and a time delay switch located in the path of travel of said moved switch actuating member and having electrical connection with said latch means, said switch being engaged by said switch actuating member and operating said latch means when the leaky can reaches said discharge turret to clamp the can in the turret to carry it beyond the place of discharge of the good cans.

WILLIAM W. MAHER.

REFERENCES CITED

The following references are of record in the file of this patent:

UNITED STATES PATENTS

| Number | Name | Date |
| --- | --- | --- |
| 1,766,019 | Garrett | June 24, 1930 |
| 2,101,129 | Cameron | Dec. 7, 1937 |
| 2,433,043 | Gray | Dec. 23, 1947 |